Jan. 3, 1967  C. G. GRANDY, JR  3,295,565
APPARATUS FOR FILLING AN EXHAUST PURIFIER
WITH CATALYST PELLETS
Filed Sept. 9, 1963

INVENTOR.
CHARLES G. GRANDY, JR.
BY Busser-Smith & Harding

ATTORNEYS

United States Patent Office 3,295,565
Patented Jan. 3, 1967

3,295,565
APPARATUS FOR FILLING AN EXHAUST
PURIFIER WITH CATALYST PELLETS
Charles G. Grandy, Jr., Radnor, Pa., assignor to Oxy-Catalyst, Inc., Berwyn, Pa., a corporation of Pennsylvania
Filed Sept. 9, 1963, Ser. No. 307,560
1 Claim. (Cl. 141—67)

This invention relates to a method and apparatus for filling and emptying an exhaust purifier containing catalyst pellets.

Catalytic exhaust purifiers for automobiles are well known to the art. This invention relates to such purifiers which employ a catalyst bed containing relatively small catalyst pellets. The catalyst pellets are normally substantially spherical and of a diameter of from about .020″ to about 1.00″, the term "diameter" being intended to mean the dimension established by sieve testing. While such a catalyst is advantageous other relatively free-flowing catalysts such as larger pellets and pellets formed by extrusion can obviously be employed while still retaining the benefits of this invention.

In accordance with this invention, there is provided means for filling a catalyst bed with catalyst pellets. When an exhaust purifier is secured to the chassis of an automobile to purify the exhaust gases from its internal combustion engine, the catalyst bed must be periodically replenished and at more frequent intervals refilled. In accordance with this invention, these tasks can be accomplished readily without removing the exhaust purifier from its installed position.

In addition, this invention provides means for emptying the catalyst pellets from the catalyst bed.

The invention and its objects will be further clarified from a study of the following description read in conjunction with the drawings in which.

Figure 1:
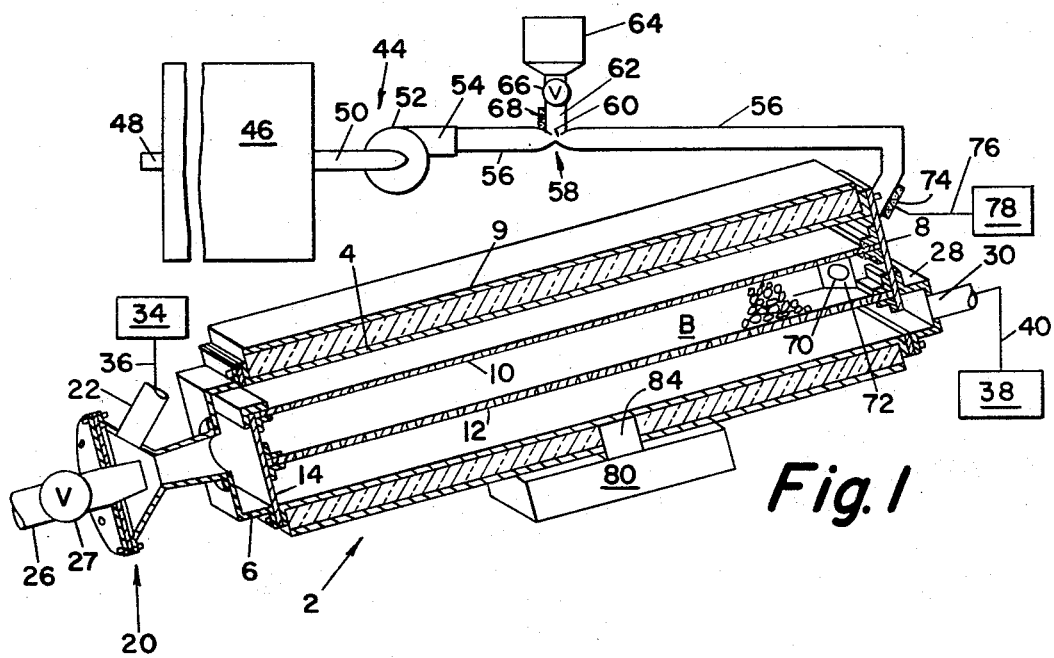
FIGURE 1 is a semi-diagrammatic view of a typical catalytic exhaust purifier showing the adding of catalyst pellets to the catalyst bed in accordance with this invention.
Figure 2:
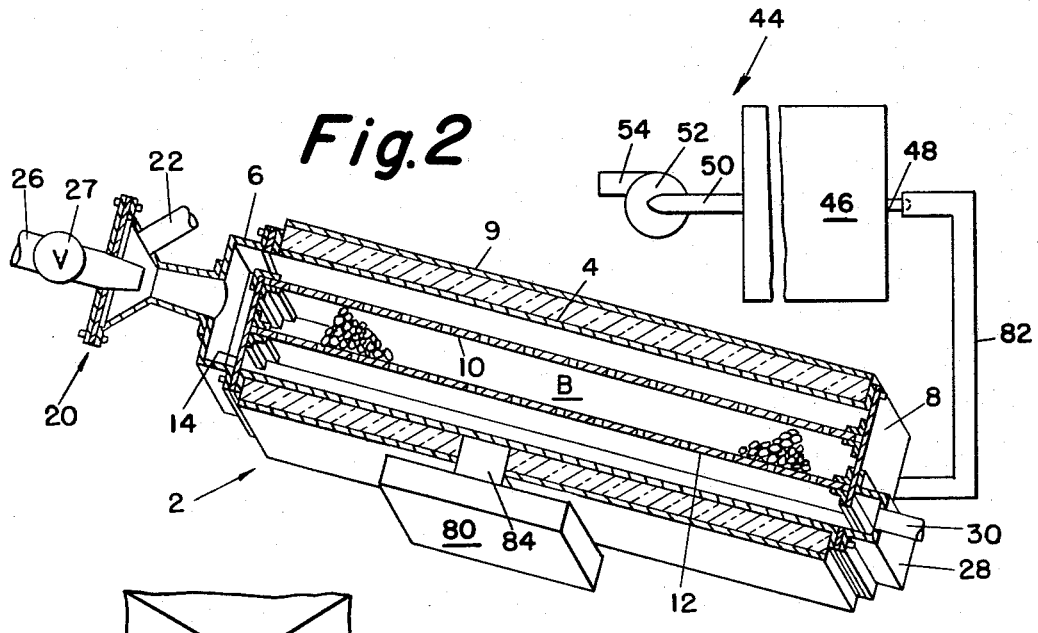
FIGURE 2 is a semi-diagrammatic view of the purifier of FIGURE 1 showing the exhausting of catalyst pellets from the catalyst bed in accordance with the invention.
Figure 3:
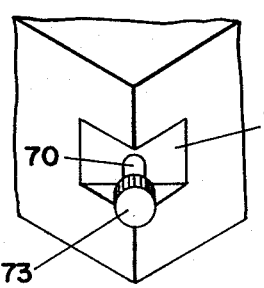
FIGURE 3 is a perspective view partially broken away of the fill pipe.

A typical catalytic exhaust purifier 2 employed with an automobile and which is typical of catalytic exhaust purifiers in connection with which this invention is useful, is shown in FIGURES 1 and 2. Referring particularly to FIGURE 1, the exhaust purifier 2 has a casing 4 to which end portions 6 and 8 are flanged. An insulation cover 9 overlies casing 4. A catalyst bed indicated at B is contained between foraminous grids 10 and 12 which are supported on baffle plate 14 and end portion 8 respectively.

End portion 6 is connected to a venturi air inspirator indicated at 20 and which is supplied with air by a conduit indicated at 22. A pipe 26 connects the air inspirator 20 to the manifold of the automobile's gasoline engine (not shown) and is provided with a valve 27. The exhaust gases passing through purifier 2 are exhausted through a manifold 28 which discharges into a pipe 30. A filter 34 is connected to air conduit 22 by a conduit diagrammatically indicated at 36 and similarly a filter 38 is connected to pipe 30 by a conduit diagramatically indicated at 40.

A vacuum cleaner 44 is provided with a filter-collector indicated at 46. Filter-collector 46 has an intake conduit 48 and discharges into conduit 50 which is connected to the intake of a blower 52 which discharges through conduit 54. The thus described vacuum cleaner 44 may be any of the industrial type vacuum cleaners which are widely available commercially.

Conduit 54 discharges into conduit 56 in which is located a venturi type inspirator 58 having an opening 60 in the upper part of its throat. A conduit 62 communicates with opening 60 and extends upwardly to a reservoir 64 for catalyst pellets. Conduit 62 is provided with a valve 66 for controlling the flow of catalyst pellets therethrough and is also provided with a screened air intake opening 68 below valve 66 which will permit the entrance of air and prevent the passage of pellets.

Conduit 56 has its discharge end connected to a fill pipe 70 in a chamfered corner portion 72 of exhaust purifier 2. Fill pipe 70 is provided with a threaded cap 73 to close the fill pipe when not in use. Conduit 56 adjacent its discharge end is provided with a screened air discharge opening 74 which will permit the passage of air but not pellets therethrough. Advantageously the discharge from screened opening 74 is connected by a line 76 to a filter indicated at 78 for the collection of catalyst dust. A vibrator 80 is removably secured to a beam 84 secured to casing 4.

*Operation*

To carry out the filling operation, hopper 64 is filled with catalyst pellets and valve 27 is closed to prevent dust and the like being blown into the engine. Dust filters 34 and 38 while not necessary to the filling operation are desirably employed. The exhaust purifier is tilted to the position shown in FIGURE 1 so as to make fill pipe 70 communicate with bed B at a point higher than the remainder of the catalyst bed B. Where exhaust purifier 2 is attached to an automobile this will be accomplished by elevating the right rear end of the automobile, for example, by a jack.

With conduit 56 connected to fill pipe 70, blower 52 is placed into operation causing air to flow through venturi inspirator 58 with the resultant flow of air through screened opening 68 into conduit 62. Vibrator 80 is also activated. Then valve 66 is opened with the resultant entrainment of catalyst pellets in the air stream flowing through opening 60 and thence through conduit 56 for discharge into the area between grids 10 and 12. Due to the position of exhaust purifier 2, the vibration thereof and the flow of air, the catalyst pellets will fill the entire space between grids 10 and 12.

As the catalyst bed B becomes nearly completely full, the flow of air through fill pipe 70 into and through the catalyst bed becomes restricted. This condition is such that the filling of the bed will not be fully accomplished without provisions for taking care of the restricted air flow. Under these conditions the air passes out through screened opening 74 in conduit 56 while still impelling the catalyst pellets into the area between grids 10 and 12 and hence resulting in the complete filling of the catalyst bed B.

Eventually after catalyst bed B is filled, the catalyst pellets will quickly commence to fill up the discharge end of conduit 56 to block off screened opening 74. When this occurs provisions must be made to prevent the air from flowing back up into conduit 62 and blowing the catalyst pellets out of the reservoir 64. This condition is taken care of by the screened opening 68 which permits the flow of air out through the conduit 62 rather than upwardly through conduit 62 and into reservoir 64.

After the filling operation has been completed, conduit 56 will be removed and fill pipe 70 closed with cap 73. Valve 27 will be opened and dust filters 34 and 38 with their accompanying conduits 36 and 40 will be removed. Similarly vibrator 80 will be removed. The thus filled exhaust purifier will then be ready for operation. It will be appreciated that the filling operation may be carried out to completely fill between grids 10 and 12 after the exhaust purifier has been emptied of the catalyst pellets or to simply add some fresh pellets to replace catalyst lost by attrition.

Referring now to FIGURE 2, the exhaust purifier 2 is readily emptied of catalyst pellets employing the vacuum cleaner 44. A conduit 82 is employed to connect fill pipe 70 to intake conduit 48 of filter-collector 46. For this operation, the exhaust purifier 2 is tilted so that fill pipe 70 communicates with the low point of catalyst bed B. This can be accomplished by elevating as by jacking the left front end of the automobile to which the exhaust purifier is attached. When the exhaust purifier has been tilted, blower 52 is placed in operation which causes air to flow through catalyst bed B entraining pellets into conduit 82 and conduit 48 into filter-collector 46 where the catalyst pellets are retained, the air passing through conduit 50 through blower 52 and being discharged through blower conduit 54. During this operation vibrator 80 is in operation and vibrates exhaust purifier 2 causing the vibration of the catalyst in bed B to assist flowing towards and into conduit 82.

It will be understood that the above described embodiments and operations are illustrative only and are not intended to be limiting.

What is claimed is:

In combination with a catalytic exhaust purifier having a housing containing a pair of grids defining a catalyst bed area; a blower, a conduit connecting the discharge end of said blower with said catalyst bed area, said conduit having a venturi portion, a catalyst reservoir, a pipe connecting said reservoir to the venturi portion of said conduit for the entrainment of catalyst pellets in a stream of air in said conduit, said pipe having a screened opening for the passage of air between the conduit and the reservoir.

References Cited by the Examiner

UNITED STATES PATENTS

| | | | |
|---|---|---|---|
| 2,064,213 | 12/1936 | McJoynt | 141—67 |
| 2,595,262 | 5/1952 | Hood | 141—77 X |
| 2,907,405 | 10/1959 | Marshall | 55—309 |
| 3,010,766 | 11/1961 | Coski | 302—51 |

FOREIGN PATENTS

| | | |
|---|---|---|
| 596,302 | 5/1934 | Germany. |
| 715,416 | 12/1941 | Germany. |

SAMUEL ROTHBERG, *Primary Examiner.*

LAVERNE D. GEIGER, *Examiner.*

E. EARLS, *Assistant Examiner.*